C. C. KRIBS.
Coffee-Pot.
No. 200,205.    Patented Feb. 12, 1878.
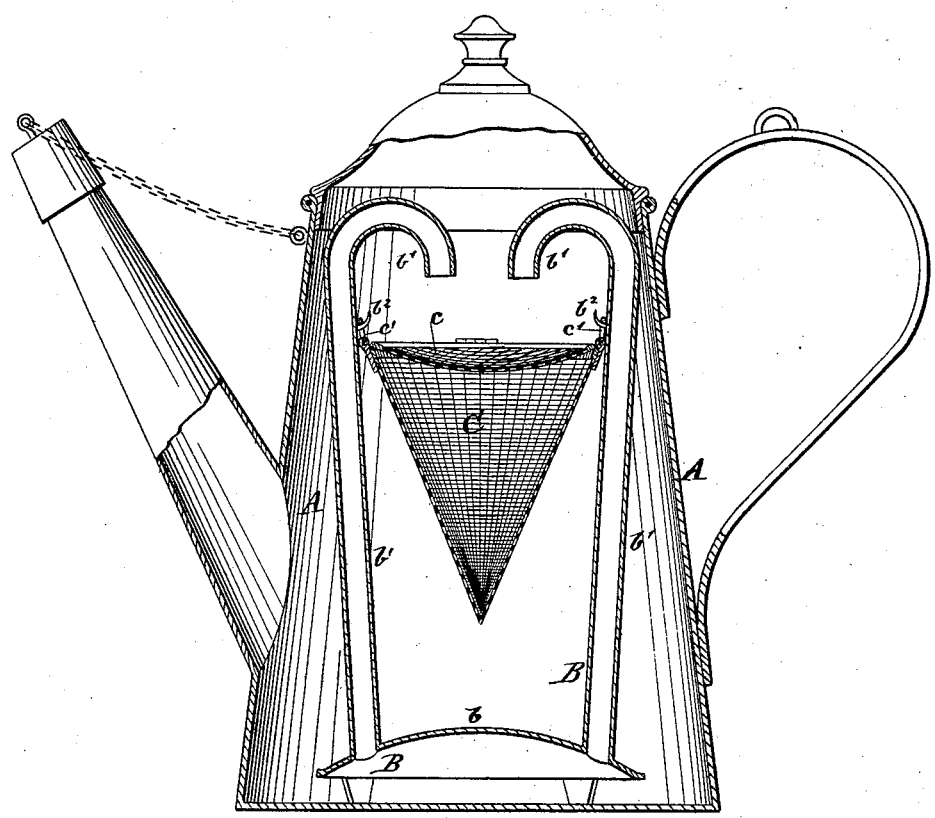
WITNESSES:
INVENTOR:
ATTORNEYS.

UNITED STATES PATENT OFFICE.

CHARLES C. KRIBS, OF TREMPEALEAU, WISCONSIN.

IMPROVEMENT IN COFFEE-POTS.

Specification forming part of Letters Patent No. 200,205, dated February 12, 1878; application filed January 2, 1878.

*To all whom it may concern:*

Be it known that I, CHARLES C. KRIBS, of the village and county of Trempealeau, and State of Wisconsin, have invented a new and Improved Coffee-Pot, of which the following is a specification:

The object of my invention is to provide an improved device for extracting the strength of coffee in a coffee-pot more rapidly and thoroughly than can be done by present devices.

The invention consists, in combination with a coffee-pot, of a water-circulator and a perforated coffee-receptacle, the circulator consisting of two or more upright pipes fixed on a base-plate or false bottom and bent downward at their upper ends, and the receptacle being suspended between the said pipes or tubes on hooks attached to them, as will be hereinafter described.

The accompanying drawing represents a vertical section of a coffee-pot embodying my improvement.

Similar letters of reference indicate corresponding parts.

A is the coffee-pot, the top and spout of which are provided with tight-fitting covers. B is the water-circulator, the base-plate $b$ of which is slightly elevated from the bottom of the pot A by feet or a perforated vertical rim, so as to admit water under the said plate or false bottom. This base-plate $b$ of the circulator B is preferably of a spherical shape, and has no perforations, except those for receiving and securing the upright tubes $b^1$. These tubes reach to, or about to, the cover of the pot, and their upper ends are bent down, as seen in the drawing, and end over or in the coffee-receptacle C. The receptacle is a numerously-perforated hollow cone, provided with a similarly-perforated cover, $c$, hinged to it at one side, and securable by a catch at the opposite side. The cone C is also provided with hinged rings or lugs $c'$, by which it may be suspended on hooks $b^2$, oppositely attached to the pipes $b^1$, so as to be held in position between the said pipes beneath their downward-turned ends.

The operation is as follows: The receptacle C being supplied with coffee, and the pot A about half filled with water, and heat applied below it, the water nearest the bottom will first be heated, and, confined by the base-plate $b$, when brought to ebullition, will rise through the tubes $b^1$, and flow from their upper ends into and through the receptacle C and the coffee placed therein. Thus a continuous circulation is kept up, and the coffee rapidly prepared for use.

I am aware that it is not new in coffee or tea pots to use an inverted cup and a vertical tube having perforated holder; but

What I claim is—

The reticulated holder C of a coffee or tea pot, suspended between spray pipes or tubes $b^1$ $b^1$, and under the curved upper ends of said tubes, as and for the purpose specified.

CHARLES CRAMER KRIBS.

Witnesses:
S. W. BUTTON,
F. H. KRIBS.